(12) United States Patent
Robinson et al.

(10) Patent No.: US 7,184,774 B2
(45) Date of Patent: Feb. 27, 2007

(54) COORDINATION AMONG MOBILE STATIONS SERVICING TERMINAL EQUIPMENT

(75) Inventors: William Neil Robinson, Grayslake, IL (US); Jheroen Pieter Dorenbosch, Paradise, TX (US)

(73) Assignee: Motorola, Inc., Schaumburg, IL (US)

( * ) Notice: Subject to any disclaimer, the term of this patent is extended or adjusted under 35 U.S.C. 154(b) by 1069 days.

(21) Appl. No.: 10/012,907

(22) Filed: Oct. 30, 2001

(65) Prior Publication Data

US 2003/0083061 A1 May 1, 2003

(51) Int. Cl.
*H04Q 7/20* (2006.01)
(52) U.S. Cl. .............. 455/452.1; 455/452.2; 455/445
(58) Field of Classification Search ............. 455/452.1, 455/452.2, 517, 445, 41.2, 11.1, 426.2, 554.1
See application file for complete search history.

(56) References Cited

U.S. PATENT DOCUMENTS

| 5,412,654 | A | 5/1995 | Perkins |
| 5,822,309 | A | 10/1998 | Ayanoglu et al. |
| 5,923,702 | A | 7/1999 | Brenner et al. |
| 5,987,011 | A | 11/1999 | Toh ............................ 370/331 |
| 6,134,587 | A | 10/2000 | Okanoue |
| 6,735,417 | B2 * | 5/2004 | Fonseca et al. ............ 455/11.1 |
| 6,965,948 | B1 * | 11/2005 | Eneborg et al. ............. 709/250 |
| 2002/0146981 | A1 * | 10/2002 | Saint-Hilaire et al. ........ 455/41 |

* cited by examiner

*Primary Examiner*—Barry Taylor
(74) *Attorney, Agent, or Firm*—Charles W. Bethards

(57) ABSTRACT

Coordination among mobile stations enables a terminal device (114) to establish a most appropriate wireless network connection. According to the present invention, a connection request, including network connectivity requirements, is communicated from the terminal device (114) to a first mobile station (116). The first mobile station (116) then transmits the network connectivity requirements to a second mobile station (117–119) that is also capable of establishing a wireless network connection. A determination based in part or in whole on the network connectivity requirements is then made at one of the first and second mobile stations (116–119) which station can provide a most appropriate wireless network connection. A network connection is then established through one of the first and second mobile stations (116–119) based on the determination of which of the first and second mobile stations (116–119) can provide the most appropriate wireless network connection.

21 Claims, 3 Drawing Sheets

COORDINATION AMONG MOBILE STATIONS SERVICING TERMINAL EQUIPMENT

FIELD OF THE INVENTION

The present invention relates generally to wireless network systems, and more particularly to a wireless network system in which mobile stations such as cellular phones provide and maintain a most appropriate wireless network connection for a terminal device by exchanging network connectivity requirements of the terminal device with one another.

BACKGROUND OF THE INVENTION

Conventional terminal devices such as laptop computers and handheld PALM devices are capable of connecting to a packet data network (PDN) or to the public switched telephone network (PSTN) through a wireless connection. A terminal device typically makes such a network connection when, for example, it is linked via a connector or cable to a mobile station such as a cellular phone that functions as a wireless modem. As a result, a network subscriber can access the Internet from any location in which cellular network coverage is available. However, handover to a second mobile station would be impossible unless the connector/cable link was changed from the original mobile station to a second mobile station.

One suggested solution to the above connectivity problem would enable a network connection to be facilitated via an ad hoc network in which the terminal device, the cellular phone and other terminal devices and cellular phones all act as nodes to form a node-to-node connection from the terminal device to the network. However, as all nodes in the ad hoc network would be both originating and terminating nodes, such an ad hoc network would be complex. In addition, an ad hoc network would be expensive because all terminal devices and phones used to form the node-to-node connection would have to include appropriate connectivity hardware and software. As conventional cell phones and laptop equipment do not include such features, implementation using 2.5 and third generation cell phone technology would not be feasible.

SUMMARY OF THE INVENTION

Accordingly, the present invention provides a method of optimizing wireless network connections for terminal devices by permitting a first mobile station that establishes a wireless network connection to communicate a request for network connection service by a terminal device to other mobile stations. The first mobile station and the other mobile stations then either jointly or independently determine which of the mobile stations best satisfies the requirements for the particular network connection service request. This determination is based upon service requirement parameters communicated from the terminal device to the first mobile station or based upon availability of the first mobile station. The chosen mobile station then establishes the network communication between a service provider and the terminal device.

Consequently, it is possible for a terminal device to make a network service connection request to a first mobile station and to have the request forwarded to a more suitable mobile station if the first mobile station cannot meet the terminal devices requirements so that the more suitable mobile station can provide the services.

BRIEF DESCRIPTION OF THE DRAWINGS

Additional objects and advantages of the present invention will be more readily apparent from the following detailed description of preferred embodiments thereof when taken together with the accompanying drawings in which.

DETAILED DESCRIPTION OF THE PREFERRED EMBODIMENTS

In overview form the present disclosure concerns communications systems or networks and methods therein arranged an constructed to link terminal devices with requested services either initially or dynamically as those services vary according to the demands of the terminal equipment or availability of such services. Such systems or networks are expected to be advantageous as future generations (2.5G and 3 G) of cellular and cellular like equipment become available. As further discussed below various inventive principles and combinations thereof are advantageously employed to effect the arranging for services for the terminal equipment within the wireless communications network thus better meeting the needs or requirements of subscriber devices on an as required basis provided these principles or equivalents are utilized.

The instant disclosure is provided to further explain in an enabling fashion the best modes of making and using various embodiments in accordance with the present invention. The disclosure is further offered to enhance an understanding and appreciation for the inventive principles and advantages thereof, rather than to limit in any manner the invention. The invention is defined solely by the appended claims including any amendments made during the pendency of this application and all equivalents of those claims as issued.

It is further understood that the use of relational terms such as first and second, top and bottom, and the like, if any, are used solely to distinguish one from another entity, item, or action without necessarily requiring or implying any actual such relationship or order between such entities, items, or actions. Much of the inventive functionality and many of the inventive principles are best implemented with or in software programs or instructions to be executed by controllers as appropriate. It is expected that one of ordinary skill, notwithstanding possibly significant effort and many design choices motivated by, for example, available time, current technology, and economic considerations, when guided by the concepts and principles disclosed herein will be readily capable of generating such software instructions and programs with minimal experimentation. Therefore further discussion of such software, if any, will be limited in the interest of brevity and minimization of any risk of obscuring the principles and concepts in accordance with the present invention.

Figure 1:
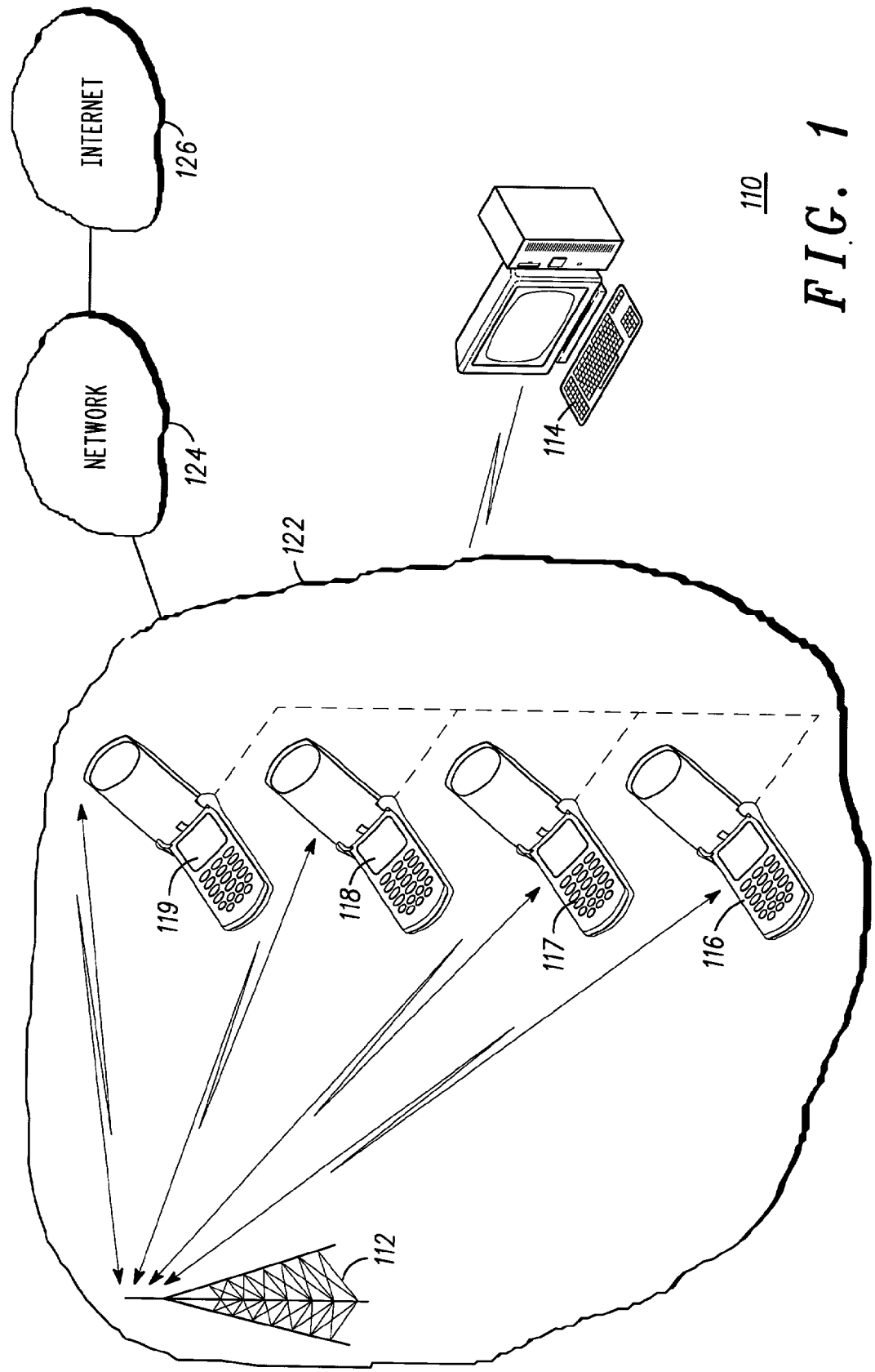
FIG. 1 is a system diagram of an exemplary wireless communication network in which the mobile station coordination according to a preferred embodiment of the present invention is implemented.

The present disclosure will discuss various embodiments in accordance with the invention. The system diagram of FIG. 1 will be used to lay the groundwork for a deeper understanding of the present invention and advantages thereof. FIG. 1 in large part and at the simplified level depicted is a representative diagram of a wireless communications network 10 that will serve to explain the problems and certain inventive solutions thereto according to the present invention.

Referring now to the drawings in which like reference numerals refer to like items, FIG. 1 shows an exemplary wireless communications system 110 in which mobile station coordination according to a preferred embodiment of the present invention is implemented. The wireless communications system 110 includes a service provider 112, a terminal device 114 for requesting network services from the service provider 112 and a plurality of mobile stations such as, for example, mobile or portable cellular telephones, 116–119 or similar communications devices. In accordance with a preferred embodiment of the present invention, the mobile stations 116–119 have the ability to communicate with one another to determine and establish a most appropriate wireless network connection between the service provider 112 and the terminal device 114 within a predetermined service provider zone of coverage 122. Each of these components and the manner in which they function to implement the mobile station coordination of the present invention will be discussed below in more detail.

The service provider 112 provides wireless network services such as, for example, voice data or packet data transmission services, to the mobile stations 116–119 within the predetermined zone of coverage 122, and enables a mobile station capable of providing a most appropriate wireless network connection to link the terminal device 114 to a communications network 124 such as, for example, a local area network, a wide area network, a packet data network or the publicly switched telephone network, and ultimately to the Internet 126 in a manner well known in the art. While the service provider 112 is represented in FIG. 1 by a cellular tower that is in communication with the network 124, it should be understood that the service provider 112 could provide network connection capabilities by means other than through cellular communication. For example, the service provider 112 could provide network connection capabilities via a satellite link. It should also be understood that even though the mobile stations 116–119 may use different service providers, they still may be able to link the terminal device 114 to the communications network 124.

As shown in FIG. 1, the terminal device 114 is a laptop computer including a wireless modem (not shown). However, the terminal device 114 may be any type of wireless communication device having the capability of requesting wireless services from a mobile station such as the mobile stations 116–119 or the service provider 112 and for communicating via a wireless connection over the communications network 124. The terminal device 114 continuously scans for network connections that can provide wireless or wired network connectivity into the network 124 and has network connectivity requirements that it communicates to devices that can provide a network connection, such as the mobile stations 116–119. Preferably, the terminal device 114 communicates these network connectivity requirements to the mobile stations 116–119 via a short range, low power wireless connection by using, for example, a micro or pico modem or commercially available wireless IP or Bluetooth™ communication protocol. However, the terminal device 114 can communicate these network connectivity requirements to the mobile stations 116–119 via any adequate wireless communication protocol.

According to one preferred embodiment of the present invention, the mobile stations 116–119 are 2.5 or third generation wireless devices capable of establishing a network connection between the terminal device 114 and the network 124 through the service provider 112. The mobile stations 116–119 are capable of communicating with each other to determine and establish a most appropriate wireless network connection between the service provider 112 and the terminal device 114 within the predetermined zone of coverage 122 via, for example, a wireless local network using a protocol that runs on top of Transmission Control Protocol (TCP) or User Datagram Protocol (UDP), which in turn would run on top of a wireless local area network. Optionally, the mobile stations 116–119 could communicate with one another through the terminal device 114 or via the service provider 112. Each of the mobile stations 116–119 can evaluate whether it satisfies the network connectivity requirements of the terminal device 114 by, for example, querying the service provider 112 and receiving network-based instructions back from the service provider 112, by reading the overhead messages broadcast by the service provider 112 that describe the connectivity capabilities of an initial wireless network connection established through, for example, the first mobile station 116 for the terminal device 114, by measuring the quality of the wireless link to estimate its connectivity capabilities, or by comparing the connectivity requirements of the terminal device 114 with connection capabilities that have recently been used or that are currently being used.

Figure 2:
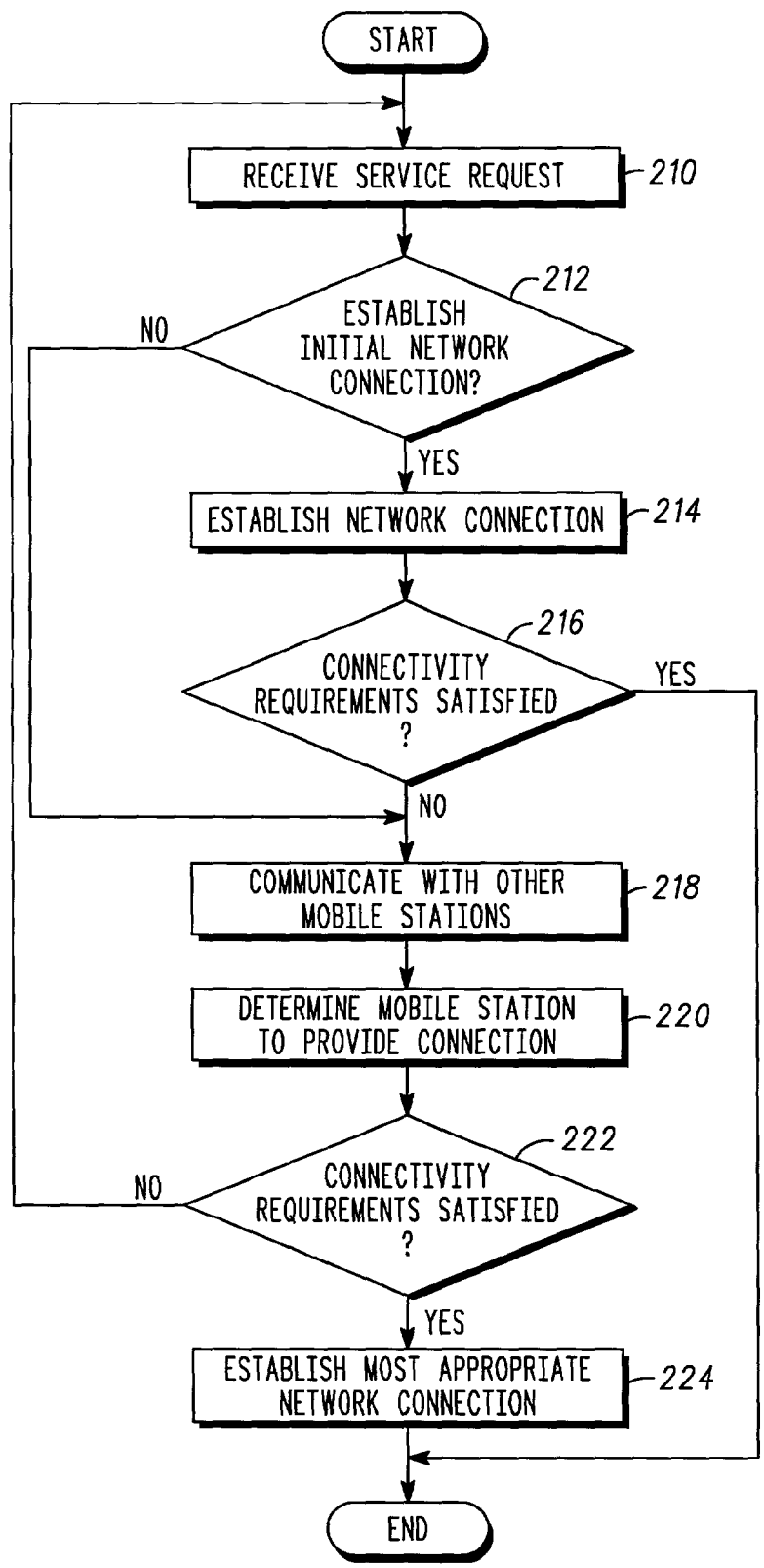
FIG. 2 is a flow diagram illustrating the process by which a network connection is established through the mobile station coordination of the present invention.

Referring now to FIG. 2, operation of the system will be discussed in more detail, with reference being made to the exemplary wireless communications system 110 shown in FIG. 1. Specifically, at 210, a mobile station, such as the first mobile station 116, receives via a first wireless connection a service request for network access from the terminal device 114 that includes network connectivity requirements of the terminal device 114 such as bandwidth and destination network information as well as required protocols to be used for mobile station coordination purposes. At 212, the first mobile station 116 determines if it can meet the network connectivity requirements and if it has sufficient bandwidth available to meet the bandwidth requirements of the terminal device 114. If at 212 the first mobile station 116 has sufficient bandwidth and can meet the network connectivity requirements of the terminal device 114, at 214 it automatically establishes a connection with the network 124 to enable the terminal device 114 to receive the service requested at 210. At 216, the first mobile station 116 determines whether it can continue to adequately meet the network connectivity requirements. If it determines that it can continue to adequately meet the network connectivity requirements, it may maintain the wireless network connection and may not attempt to communicate with the other mobile stations 117–119.

If at 212 the first mobile station 116 cannot initially meet the network connectivity requirements, or at 216 it can no longer satisfy connectivity requirements, at 218 it communicates the service request and network connectivity requirements to a pre or currently determined plurality of second mobile stations, such as the mobile stations 117–119, by one of the above-discussed communication modes. It should be noted that the first mobile station 116 also communicates with the second mobile stations 117–119, even though it is able to establish an initial network connection at 212, if potential connectivity switching conditions exist. Potential connectivity switching conditions may exist if, for example, the bandwidth requirements of the terminal device 114 change, or an existing network connection is degraded as the first mobile station 116 leaves a service area. Additionally at 218, the terminal device 114 preferably provides a list of mobile stations that it has recently contacted to the first mobile station 116. Alternatively, the service provider 112 may provide a list of mobile stations that are registered with the service provider 112 and that are within the service provider zone of coverage 122 or near the geographic location of the first mobile station 116. The list may include supplemental information about each mobile station including mobile station identifiers, mobile station types, or operators. The first mobile station 116 may also use known wireless discovery methods, such as those according to the Bluetooth specification, to discover the presence of the plurality of mobile stations 117–119. It will be appreciated that as the mobile stations 117–119 and others move about relative to mobile station 116, the terminal device 114, or service provider 112 their abilities to support a desired connection with device 114 will vary.

At 220, each of the plurality of mobile stations 116–119 determines if it can satisfy the network connectivity requirements of the terminal device 114. If more than one mobile station satisfies the network connectivity requirements of the terminal device 114, supplemental connectivity requirements can be evaluated to determine which of the mobile stations 116–119 provides a most appropriate wireless network connection. For example, if the service request of the terminal device 114 includes a high bandwidth network connectivity requirement, only those mobile stations that have high bandwidth capabilities will be selected at 220. If several available mobile stations meet the network connectivity requirements even after additional factors are considered, the mobile station that has, for example, the most available bandwidth or the highest potential throughput may be selected. Also, if, for example, the terminal device 114 requests a voice connection, and more than one mobile station is capable of providing such a connection, a mobile station that already has an established voice connection may be chosen to provide the most appropriate wireless network connection. In addition, the mobile stations may be required to support certain protocols, such as a specific packet data protocol, or a specific session management protocol, such as Session Initiation Protocol (SIP). Only a mobile station that is capable of supporting the required protocols will be chosen. Factors related to the desirability of supporting a connection from the mobile stations perspective may also be used to select the proper mobile station. For example, remaining battery life or economic considerations may be considered.

It should be appreciated that one of the mobile stations, such as the first mobile station 116, the terminal device 114, or the service provider 112 itself can be utilized to identify the mobile station that will provide the most appropriate wireless network connection. For example, if the first mobile station 116 is utilized to identify the mobile station capable of providing the most appropriate wireless network connection, all of the other second mobile stations 117–119 communicate the results of their internal evaluations to the first mobile station 116. The first mobile station 116 then determines which of the mobile stations 116–119 is capable of providing the most appropriate wireless network connection after comparing all of the internal evaluations made by the mobile stations 116–119. The first mobile station 116 can also send out supplemental network connectivity requirements as discussed above if it concludes that more than one mobile station satisfies the network connectivity requirements specified by the terminal device 114.

If the service provider 112 is utilized to determine which of the mobile stations 116–119 provides the most appropriate network connection, at 218 the service provider 112 can request the mobile stations 116–119 to provide their respective network connectivity capabilities. After evaluating these capabilities, at 220 it can determine which of the mobile stations 116–119 is capable of providing the most appropriate network connection and transmit network-based instructions to the mobile stations 116–119 regarding which of the mobile stations should be utilized to provide the most appropriate network connection.

Alternatively, at 220 the mobile stations 116–119 can jointly identify the mobile station capable of providing the most appropriate wireless network connection. For example, each of the mobile stations 116–119 can maintain a list of all other mobile stations that received the service request and network connectivity requirements from the terminal device 114. Each of the mobile stations can then communicate the results of its own internal evaluation to the other mobile stations on the list, and can eliminate itself from the list if it fails to satisfy the network connectivity requirements. Consequently, the mobile station that is capable of providing the most appropriate wireless network connection will be selected.

At 222, if none of the mobile stations satisfies the network connectivity requirements specified by the terminal device 114, the first mobile station 116 (or, alternatively as discussed above, the network component programmed to select a mobile station capable of providing a most appropriate network connection) can communicate this result to the terminal device 114. The first mobile station 116 can then receive a supplemental service request from the terminal device 114 with less stringent network connectivity requirements that increases the probability of identifying a mobile station that can provide a most appropriate wireless network connection.

If at 222 it is determined that a mobile station does satisfy the network connectivity requirements of the terminal device 114, at 224 the wireless network connection is established via that mobile station. If it is determined that the first mobile station 116 is no longer capable of providing the most appropriate wireless network connection, a handover procedure is used to switch the connection from the first mobile station 116 to a mobile station, such as the second mobile station 117, selected to provide the most appropriate wireless network connection. During the handover procedure, the first mobile station 116, the selected second mobile station 117 and the terminal device 114 collaborate to switch the connection established between the first mobile station 116 and the terminal device 114 to the selected second mobile station 117. Typically, the handover procedure will be done using known methods provided by the protocols used on the wireless link established between the first mobile station 116 and the terminal device 114. Depending on the protocol, the first mobile station 116 may be required to inform the terminal device 114 on how the terminal device 114 can connect to the second mobile station 117 by, for example, passing the ID or address of the second mobile station 117. Alternatively, the first mobile station 116 may be required to inform the second mobile station 117 on how the second mobile station 117 can connect to the terminal device 114 by, for example, passing the ID or address of the terminal device 114.

Figure 3:
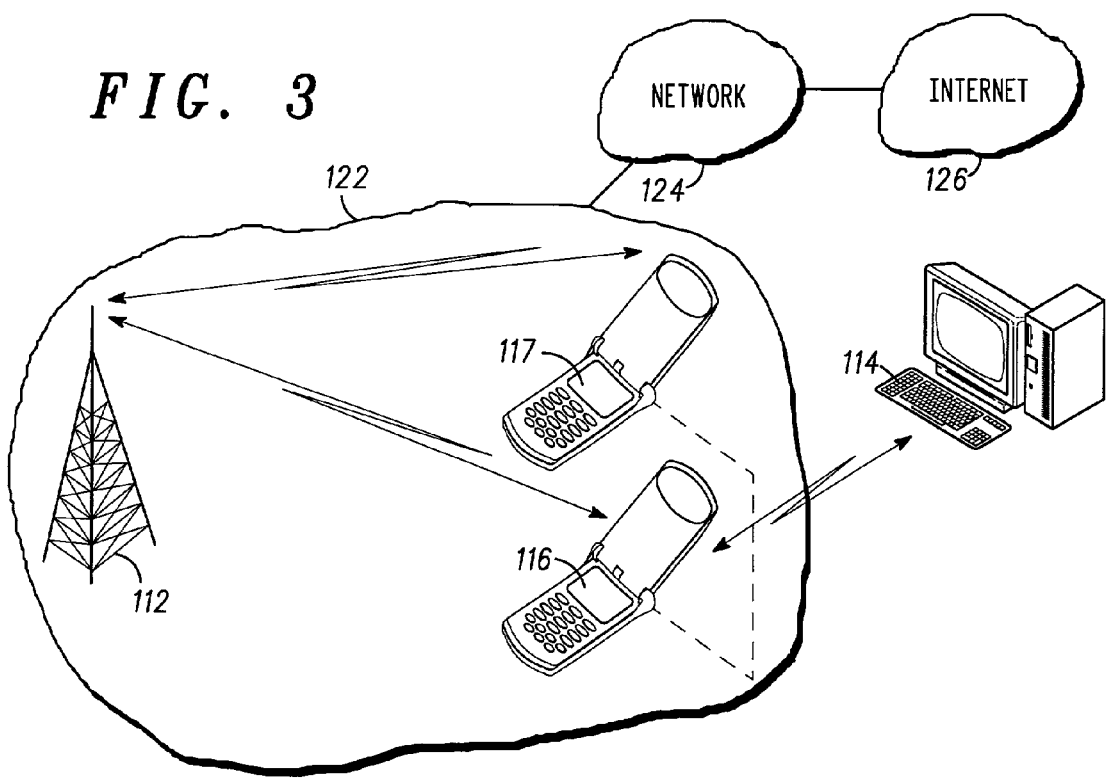
FIG. 3 is a system diagram of the exemplary wireless communication network of FIG. 1 illustrating coordination among mobile stations in accordance with the present invention.
Figure 4:
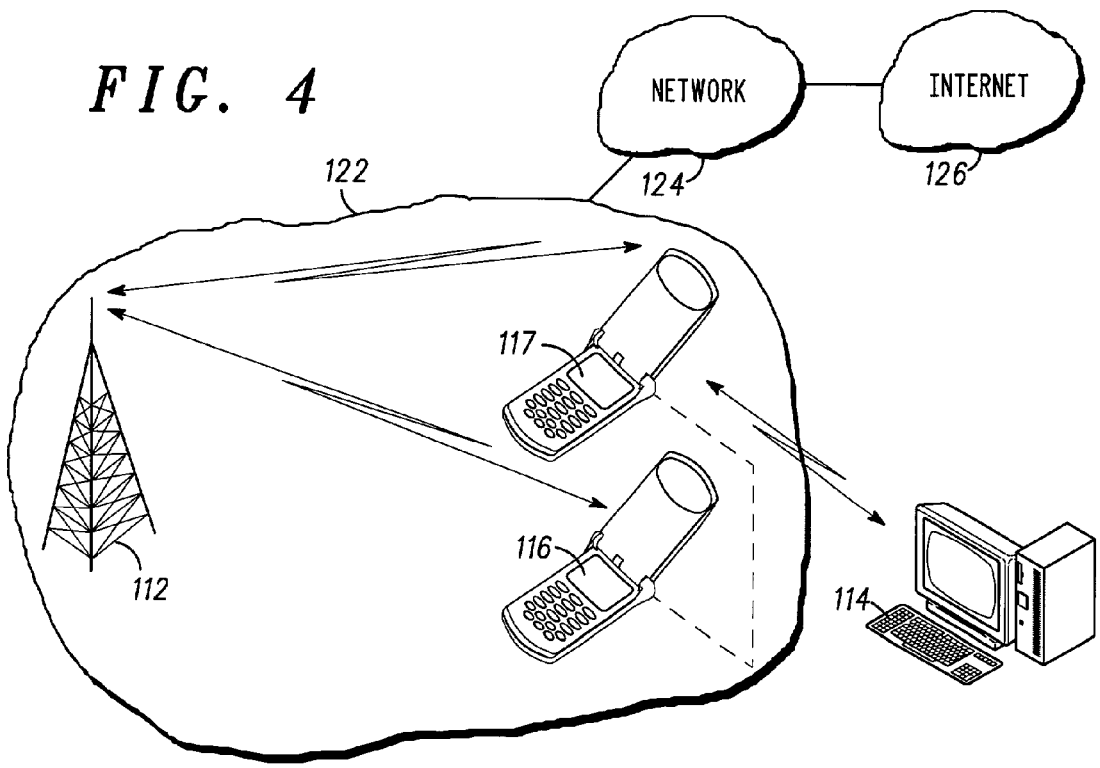
FIG. 4 is a system diagram of the exemplary wireless communication network of FIG. 1 showing a wireless network connection established through the mobile station coordination of the present invention.

A specific example of the above-discussed handover procedure is illustrated in FIGS. 3–4. In FIG. 3, the terminal device 114 communicates a service request to the first mobile station 116. As shown, the first mobile station 116 establishes an initial network connection with the service provider 112 for the terminal device 114. However, if the first mobile station 116 cannot satisfy the network connectivity requirements of the terminal device 114 or is otherwise determined as not being capable of providing the most appropriate wireless network connection, the mobile station coordination as discussed above in connection with FIG. 2 identifies and selects a mobile station, such as the second mobile station 117, that is capable of providing the most appropriate wireless network connection for the terminal device 114. Alternatively, if the first mobile station 116 cannot satisfy the network connectivity requirements of the terminal device 114, mobile station coordination according to another preferred embodiment of the present invention prohibits it from automatically establishing an initial network connection for the terminal device 114. Regardless, the first mobile station 116 communicates the service request to the second mobile station 117 that is also registered with or otherwise in communication with the service provider 112.

As illustrated in FIG. 4, if the second mobile station 117 is determined to satisfy the network connectivity requirements of the terminal device 114, a network connection is established between the service provider 112 and the terminal device 114 based on communication and coordination between the available mobile stations 116, 117 in accordance with the present invention.

It should be appreciated at this point that the mobile station coordination of the present invention can be initiated if the quality of service being provided by a mobile station initially selected to provide a most appropriate wireless network connection is degraded by a predetermined amount or to a predetermined level. For example, if the mobile station providing the most appropriate wireless network connection detects that the terminal device needs more bandwidth than the mobile station currently can provide, it could execute the mobile station coordination of the present invention to search for a subsequent mobile station that is more capable of providing the most appropriate wireless network connection for the terminal device 114. The connection between the service provider 112 and the terminal device 114 can then be handed over to the newly selected mobile station as discussed above.

The mobile station coordination of the present invention can also be utilized to find the most cost effective network connection for a terminal device. For example, per minute cost for each of the mobile stations 116–119 can be communicated to the terminal device 114 or to the first mobile station 116 in response to the service request from the terminal device 114. The terminal device 114 or the first mobile station 116 can then select the mobile station that can provide the most appropriate wireless network connection in the most cost effective manner. Alternatively, a mobile station that initially receives the service request can attempt to match or beat the cost quotes received from the most cost effective mobile station to minimize the number of required handovers.

The mobile station coordination of the present invention can also be utilized to match the connections of terminal devices with mobile stations in a manner that optimizes the overall performance of the service provider network. For example, a mobile station supporting an interactive packet data connection can be handed over to a mobile station with an established voice/multi-media connection. As a result, the terminal device requiring the interactive packet data connection can utilize unused time slots of the voice/multi-media connection and free up the mobile station providing the initial support, thereby improving overall network efficiency.

While the above description is of the preferred embodiment of the present invention, it should be appreciated that the invention may be modified, altered, or varied without deviating from the scope and fair meaning of the following claims. For example, the number of mobile stations in the plurality of mobile station can be one.

What is claimed is:

1. A method of linking a terminal device to a communications network, the method including the steps of:
   receiving a service request, including network connectivity requirements, from the terminal device at a first mobile station;
   at the first mobile station, communicating the network connectivity requirements to a second mobile station that is capable of providing a wireless network connection from the terminal device to the communication network;
   determining at at least one of the first and second mobile stations which of the first and second mobile stations can provide a most appropriate wireless network connection from the terminal device to the communication network based on the service request; and
   establishing the most appropriate wireless network connection through one of the first and second mobile stations based on the determining at one of the first and second mobile stations which of the first and second mobile stations can provide the most appropriate wireless network connection.

2. The method of claim 1, wherein the communicating of the network connectivity requirements to a second mobile station that is capable of providing a wireless network connection and the determining at at least one of the first and second mobile stations which of the first and second mobile stations can provide a most appropriate wireless network connection are performed during an existing wireless network connection established for the terminal device through the first mobile station.

3. The method of claim 2, wherein the communicating of the network connectivity requirements to a second mobile station that is capable of providing a wireless network connection and the determining at at least one of the first and second mobile stations which of the first and second mobile stations can provide a most appropriate wireless network connection are executed when the terminal device requires additional bandwidth.

4. The method of claim 2, wherein the communicating of the network connectivity requirements to a second mobile station that is capable of providing a wireless network connection and the determining at at least one of the first and second mobile stations which of the first and second mobile stations can provide a most appropriate wireless network connection are executed when the existing wireless network connection is degraded by a predetermined amount.

5. The method of claim 1, wherein the communicating of the network connectivity requirements to a second mobile station that is capable of providing a wireless network connection and the determining at at least one of the first and second mobile stations which of the first and second mobile stations can provide a most appropriate wireless network connection result in a handover of the existing wireless network connection from the first mobile station to the second mobile station as a result of network-based instructions.

6. The method of claim 1, wherein the communicating of the network connectivity requirements to a second mobile station that is capable of providing a wireless network connection is executed over one of an ad hoc wireless network, a cellular system, and a local wireless network.

7. The method of claim 1, wherein the communicating of the network connectivity requirements to a second mobile station that is capable of providing a wireless network connection is executed via the terminal device.

8. A method of linking a terminal device to a communications network, comprising:
communicating network connectivity requirements from a first mobile station to a second mobile station, both of which are capable of establishing a wireless network connection from the terminal device to the communication network;
determining at at least one of the first and second mobile stations which of the first and second mobile stations can provide an appropriate wireless network connection from the terminal device to the communication network based on the network connectivity requirements; and
establishing the appropriate wireless network connection based on results from the determining at at least one of the first and second mobile stations which of the first and second mobile stations can provide a most appropriate wireless network connection based on the network connectivity requirements.

9. The method of claim 8, wherein the communicating of network connectivity requirements from a first mobile station to a second mobile station and the determining at at least one of the first and second mobile stations which of the first and second mobile stations can provide a most appropriate wireless network connection based on the network connectivity requirements are performed during an existing terminal device wireless network connection established through the first mobile station.

10. The method of claim 9, wherein the communicating of network connectivity requirements from a first mobile station to a second mobile station and the determining at at least one of the first and second mobile stations which of the first and second mobile stations can provide a most appropriate wireless network connection based on the network connectivity requirements are performed when additional bandwidth is required.

11. The method of claim 9, wherein the communicating of network connectivity requirements from a first mobile station to a second mobile station and the determining at at least one of the first and second mobile stations which of the first and second mobile stations can provide a most appropriate wireless network connection based on the network connectivity requirements are executed when the existing wireless network connection established through the first mobile station is degraded to a predetermined level.

12. The method of claim 8, wherein the communicating of network connectivity requirements from a first mobile station to a second mobile station and the determining at at least one of the first and second mobile stations which of the first and second mobile stations can provide a most appropriate wireless network connection based on the network connectivity requirements further comprises:

evaluating, by a service provider, network connectivity capabilities of the first mobile station and the second mobile station; and
transmitting network-based instructions to at least one of the first mobile station and the second mobile station.

13. The method of claim 8, wherein the communicating of network connectivity requirements from a first mobile station to a second mobile station is executed over one of an ad hoc wireless network, a cellular system, and a local wireless network.

14. The method of claim 8, wherein the communicating of network connectivity requirements from a first mobile station to a second mobile station is executed via the terminal device.

15. The method of claim 8, wherein the communicating of network connectivity requirements from a first mobile station to a second mobile station, both of which are capable of establishing an appropriate wireless network connection, comprises communicating one of bandwidth requirements, connectivity pricing parameters, connectivity quality and connectivity type from the first mobile station to the second mobile station.

16. A wireless communication system, comprising:
a terminal device operable to connect to a network via a wireless network connection;
a first mobile station for providing an initial wireless network connection between the terminal device and the network;
a second mobile station for communicating with the first mobile station to exchange network connectivity requirements of the terminal device when potential connectivity switching conditions exist, the second mobile station suitable for providing a wireless network connection from the terminal device to the communication network; and
at least one of the first and second mobile stations is for determining, whether the potential connectivity switching conditions exist based on the network connectivity requirements.

17. The system of claim 16, wherein the predetermined connectivity switching conditions exist when the terminal device requires additional bandwidth.

18. The system of claim 16, wherein the predetermined connectivity switching conditions exist when the initial wireless network connection is degraded by a predetermined amount.

19. The system of claim 16, wherein the first mobile station is further for handing over the initial wireless network connection to the second mobile station when the predetermined connectivity switching conditions exist.

20. The system of claim 16, wherein the second mobile station is further for communicating with the first mobile station and the communicating is executed via the terminal device.

21. The system of claim 16, further comprising a plurality of second mobile stations for communicating with the first mobile station to exchange the network connectivity requirements of the terminal device when the potential connectivity switching conditions exist; and
the first mobile station or one of the plurality of second mobile stations is for determining whether the potential connectivity switching conditions exist based on the network connectivity requirements.

* * * * *